Patented Sept. 9, 1941

2,255,558

UNITED STATES PATENT OFFICE 2,255,558

GLASS COMPOSITION

Robert H. Dalton, Corning, N. Y., assignor to Corning Glass Works, Corning, N. Y., a corporation of New York No Drawing. Application April 22, 1939,
Serial No. 269,538

3 Claims. (Cl. 106—54)

This invention relates to glass compositions and has for its primary object the production of low expansion glasses of simple composition.

Another object is the production of a glass having a coefficient of expansion less than that of silica.

A further object is to obtain a lower expansion coefficient with a given silica content than has heretofore been possible and at the same time to combine such low expansion with ease of melting.

Still another object is the production of a glass which will seal with fused silica.

The above and other objects may be attained by practicing my invention which comprises among its features a glass which is substantially free from alkali and alkaline earth oxides and which contains silica, boric oxide and alumina, the silica being from 60% to 95% and the alumina being from 5% to 12%.

It is common knowledge that in the compounding of glass, alumina has a greater expansion factor than either silica or boric oxide, that is, its general effect in silicate glasses is to raise the expansion coefficient as compared to silica or boric oxide. Thus, according to the tables of Winkelmann and Schott, the respective cubical expansion factors are: alumina 5, silica 0.8, and boric oxide 0.1.

I have discovered that, in glasses which are free from alkali, the expansion factor for alumina is much less than the accepted value and in glasses of the ternary system $Al_2O_3$—$B_2O_3$—$SiO_2$, with a silica content above 60% and an alumina content below about 12%, any increase in the alumina content actually lowers the expansion coefficient of the glass. When the alumina is increased by substitution for boric oxide, the rate and magnitude of the reduction in expansion coefficient is greater than when alumina is substituted for silica. When the alumina content is higher than about 12%, any further increase therein causes an increase in the expansion coefficient. In other words, for glasses in this system having a silica content above 60% there is a minimum expansion coefficient for any given silica content, depending upon the amount of alumina present and, conversely, for a given expansion coefficient there is a minimum silica content. With the silica content between 60% and 91%, a minimum expansion coefficient is obtained when the alumina content is between about 8% and 12%, and with the silica between 91% and 95% a minimum expansion is obtained when the alumina is between 4% and 8%. It is possible to vary the silica content by about 14% and maintain a constant expansion coefficient by substituting the proper proportions of alumina and boric oxide therefor.

Contrary to the generally accepted belief that an increase of alumina in a glass raises the viscosity more rapidly than an increase of silica and that an increase of boric oxide lowers the viscosity, I have now found that, in the glasses of the above named ternary system having an alumina content below about 12%, any increase of alumina actually lowers the viscosity of the glass, not only when it is substituted for silica but also when it is substituted for boric oxide. From this it will be seen that my invention not only produces glasses having a lower coefficient of expansion for a given silica content than was heretofore possible, but it also produces glasses having a lower softening point than prior glasses of the same expansion. By means of my invention I am able to produce a glass having substantially the same coefficient of expansion as pure fused silica but having a lower softening point than silica and containing only 91% of silica. I have also discovered glasses having expansion coefficients less than that of pure fused silica and containing from 91% to 94% of silica. Heretofore there has been no known substance having an expansion coefficient below that of silica in the temperature range from 0° C. to 350° C., the coefficient of pure fused silica being $5.5 \times 10^{-7}$. My glasses, containing alumina, boric oxide and silica and having silica contents between 60% and 95%, have expansion coefficients falling in the range from about $4 \times 10^{-7}$ to $28 \times 10^{-7}$.

The following series of glasses demonstrates the unusual effect of alumina in my glasses whereby it lowers both the softening point and the expansion coefficient when substituted for boric oxide, the silica remaining constant:

| $SiO_2$ | $B_2O_3$ | $Al_2O_3$ | Softening point | Exp. coeff./$10^{-7}$ |
|---|---|---|---|---|
| 80 | 20 |    | 1209 | 24.7 |
| 80 | 16 | 4  | 1193 | 15.3 |
| 80 | 12 | 8  | 1161 | 12.1 |
| 80 | 8  | 12 |      | 11.7 |

The following range of compositions will illustrate the scope of my invention:

|                     | I   | II  | III | IV  | V   | VI   | VII  | VIII | IX   | X   |
|---------------------|-----|-----|-----|-----|-----|------|------|------|------|-----|
| $SiO_2$             | 94  | 91  | 89  | 86  | 83  | 80   | 78   | 75   | 65   | 61  |
| $B_2O_3$            | 1   | 1   | 4   | 4   | 7   | 12   | 14   | 20   | 25   | 27  |
| $Al_2O_3$           | 5   | 8   | 7   | 10  | 10  | 8    | 8    | 5    | 10   | 12  |
| Exp. coeff./$10^{-7}$ | 4.6 | 5.5 | 6.8 | 7.9 | 9.7 | 12.1 | 14.9 | 19.2 | 25   | 27  |

It will be noted that the above glasses have unusually low coefficients of expansion although the silica contents are from 10% to 15% below those of prior glasses having comparable expansions. The softening points are also correspondingly lower than those of prior glasses having the same expansion coefficients. Glasses IV to VIII are particularly suitable for use as the so-called quartz sealing glasses. The above glasses may be prepared by melting their batches in the usual manner but at temperatures somewhat higher than those employed for ordinary glasses. It is preferable to apply reduced pressure for fining them.

They may also be prepared advantageously by vaporizing decomposable compounds of silicon, boron and aluminum, such as silicon tetrachloride, methyl borate and aluminum chloride, into the gas stream of an oxy-gas burner and depositing and vitrifying the resultant finely divided oxides by the heat of the flame. The latter method forms the subject matter of another patent application Serial Number 269,496 filed jointly by me and Martin E. Nordberg concurrently herewith.

In the foregoing glass compositions minor quantities of certain other oxides such as lead oxide and tin oxide may be introduced without appreciably disturbing the valuable properties hereinbefore disclosed and without departing from the spirit and scope of the invention as claimed.

I claim:

1. A glass consisting of silica, boric oxide, and alumina, the silica being from 91% to 95% and the alumina being from 4% to 8%.

2. A glass having an expansion coefficient below that of fused silica and consisting of 91% to 95% $SiO_2$, .4% to 2% $B_2O_3$ and 4% to 8% $Al_2O_3$.

3. A glass consisting of approximately 94% $SiO_2$, 1% $B_2O_3$ and 5% $Al_2O_3$.

ROBERT H. DALTON.